United States Patent [19]
Davis

[11] Patent Number: 5,795,181
[45] Date of Patent: Aug. 18, 1998

[54] CONNECTOR ON A BATTERY

[75] Inventor: Wayne S. Davis, Harrisburg, Pa.

[73] Assignee: The Whitaker Corporation, Wilmington, Del.

[21] Appl. No.: 747,575

[22] Filed: Nov. 7, 1996

Related U.S. Application Data

[63] Continuation of Ser. No. 377,568, Jan. 24, 1995, abandoned.

[51] Int. Cl.$^6$ ...................................................... H01R 3/00
[52] U.S. Cl. .................................................... 439/500
[58] Field of Search .............................. 439/500, 928; 429/97–100; 320/2, 15

[56] References Cited

U.S. PATENT DOCUMENTS

| | | | |
|---|---|---|---|
| 3,268,349 | 8/1966 | Silverberg | 339/182 |
| 3,348,116 | 10/1967 | Freeman et al. | 320/2 |
| 3,728,664 | 4/1973 | Hurst | 339/91 R |
| 4,670,701 | 6/1987 | Sako et al. | 320/2 |
| 4,680,527 | 7/1987 | Benenati et al. | 320/2 |
| 4,907,987 | 3/1990 | Douty et al. | 439/571 |
| 5,004,434 | 4/1991 | Aiello et al. | 439/636 |
| 5,007,859 | 4/1991 | Sangregory et al. | 439/500 |
| 5,035,924 | 7/1991 | Steiner et al. | 15/339 |
| 5,059,885 | 10/1991 | Weiss et al. | 320/2 |
| 5,225,760 | 7/1993 | Leiserson | 320/2 |
| 5,256,955 | 10/1993 | Tomura et al. | 320/2 |
| 5,470,255 | 11/1995 | McCleerey et al. | 439/500 |

FOREIGN PATENT DOCUMENTS

| | | |
|---|---|---|
| 0 142 952 | 10/1984 | European Pat. Off. . |
| 0 291 391 | 5/1988 | European Pat. Off. . |
| 0 535 975 | 10/1992 | European Pat. Off. . |
| 0 617 486 A1 | 9/1994 | European Pat. Off. ........ H01R 23/10 |
| 244609 | 12/1925 | United Kingdom . |
| 2192496 | 3/1987 | United Kingdom . |

*Primary Examiner*—J. J. Swann
*Attorney, Agent, or Firm*—Anton P. Ness

[57] ABSTRACT

An electrical connector (1) to removably connect a battery (2) to electronic equipment comprising, an insulating header (27), conductive battery terminals (5, 6, 7, 8, 9) on the header (27), battery connecting portions on the terminals to connect with battery cells, the header (27) being assembled with an insulating package (3) containing the battery cells, and the terminals (5, 6, 7, 8, 9) extending into a terminal receiving cavity (31) of the package (3).

9 Claims, 4 Drawing Sheets

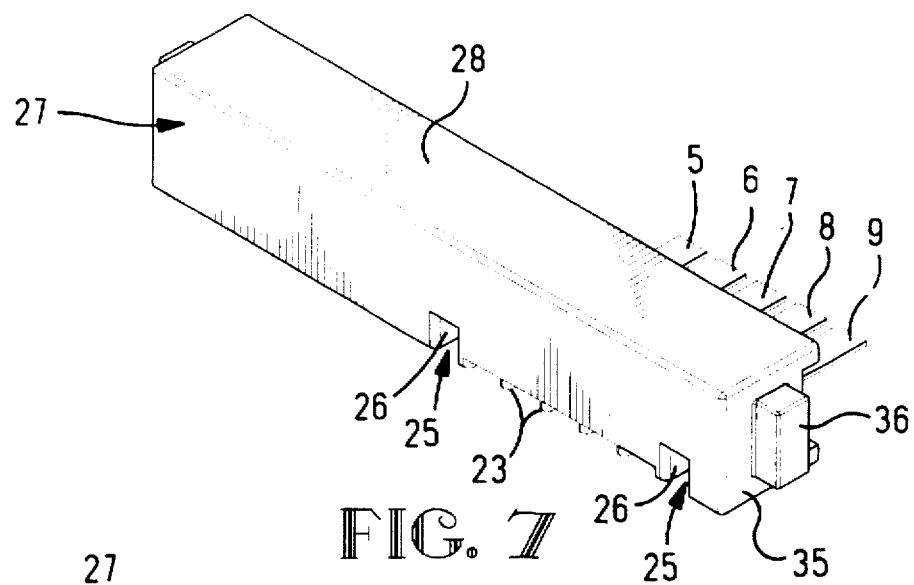
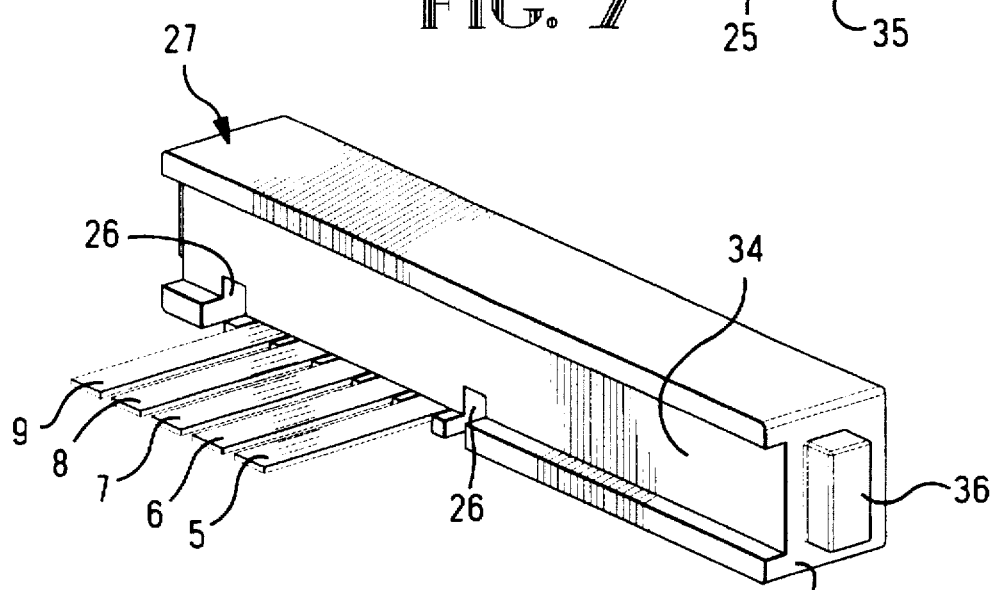
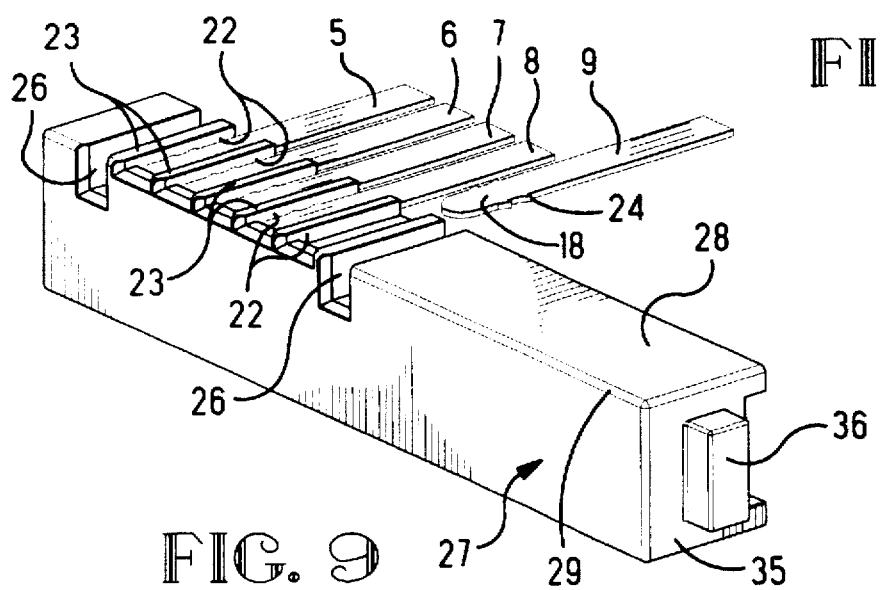

CONNECTOR ON A BATTERY

This application is a Continuation of application Ser. No. 08/377,568 filed Jan. 24, 1995, now abandoned.

FIELD OF THE INVENTION

The invention pertains to an electrical connector for a battery and more particularly to an electrical connector for connection of a rechargeable battery to a mating connector on electronic equipment that relies on the battery for a supply of electrical voltage.

BACKGROUND OF INVENTION

As disclosed in European patent Publication No. EP 0 617 486 A1, published Sep. 28, 1994, an electrical connector on a battery comprises an insulating package, conductive battery terminals in the package for connection to multiple battery cells in the package, the package comprising an end and a side of a battery when the battery is constructed with the package and with the terminals and with the battery cells.

SUMMARY OF THE INVENTION

An electrical connector to removably connect a battery to electronic equipment, comprises an insulating package interlocking with an insulating header, and conductive battery terminals on the header. Battery connecting portions on the terminals project into the package and are accessible therein for connection with battery cells in the package.

According to an embodiment of the invention, an exterior end of the header comprises at least a portion of the end of the package. An exterior side of the header comprises a portion of the side of the package, and the terminals are recessed in the exterior side of the header and extend into a terminal receiving cavity of the package for connection to the battery cells. An advantage of the invention resides in battery terminals pre-assembled onto a molded plastic header and comprising an assembly to facilitate construction of a battery.

DESCRIPTION OF THE DRAWINGS

An embodiment of the invention will now be described by way of example with reference to the drawings, according to which:

FIG. 7 is an isometric view of an assembly comprising a header and battery terminals for assembly into the package as shown in FIGS. 4, 5, and 6;

FIG. 8 is an isometric view of the header as shown in FIG. 7, illustrating a different side; and FIG. 9 is an inverted isometric view of the header as shown in FIG. 7 with parts separated from one another.

DETAILED DESCRIPTION

Figure 1:
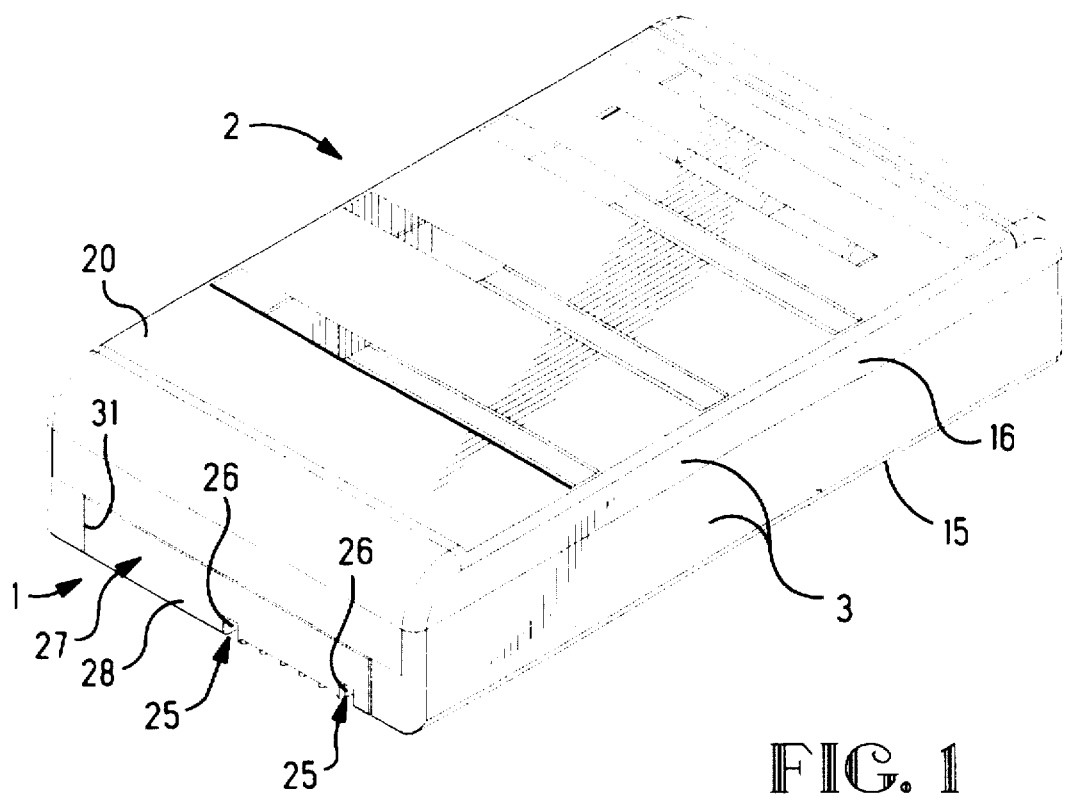
FIG. 1 is an isometric view of a battery constructed with a package and a header on which battery terminals are assembled.
Figure 2:
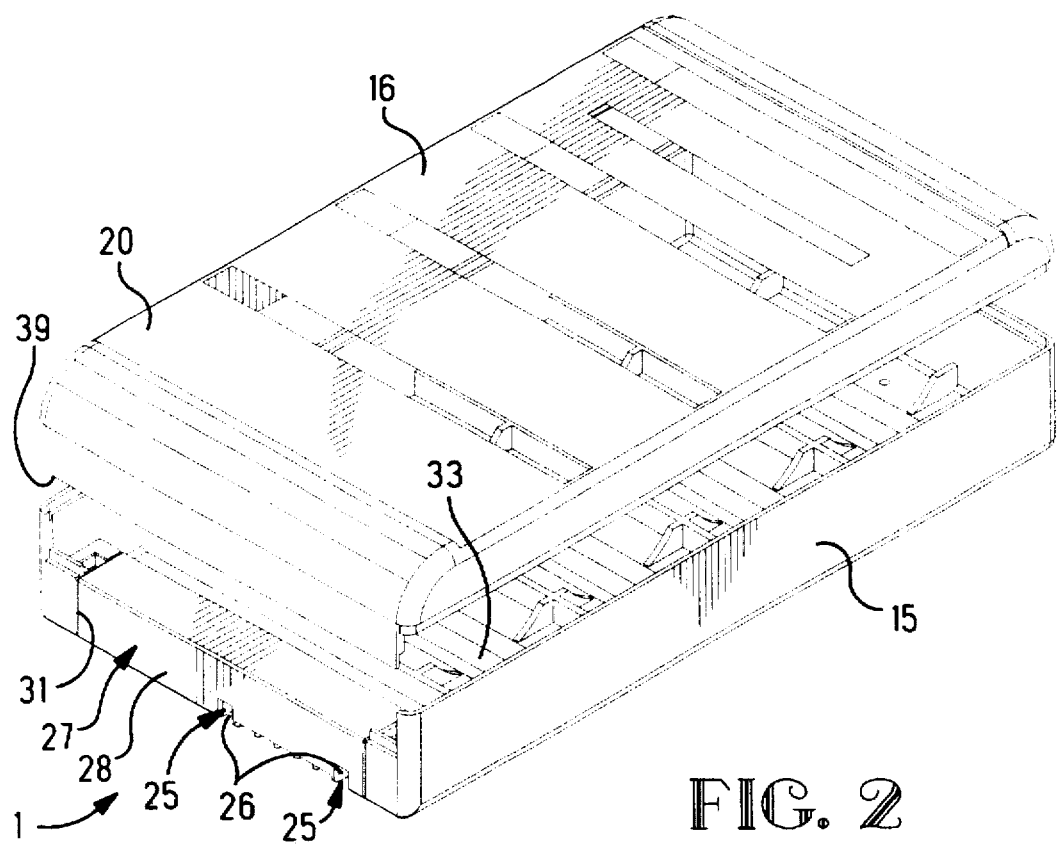
FIG. 2 is a view similar to FIG. 1 with parts separated from one another.
Figure 3:
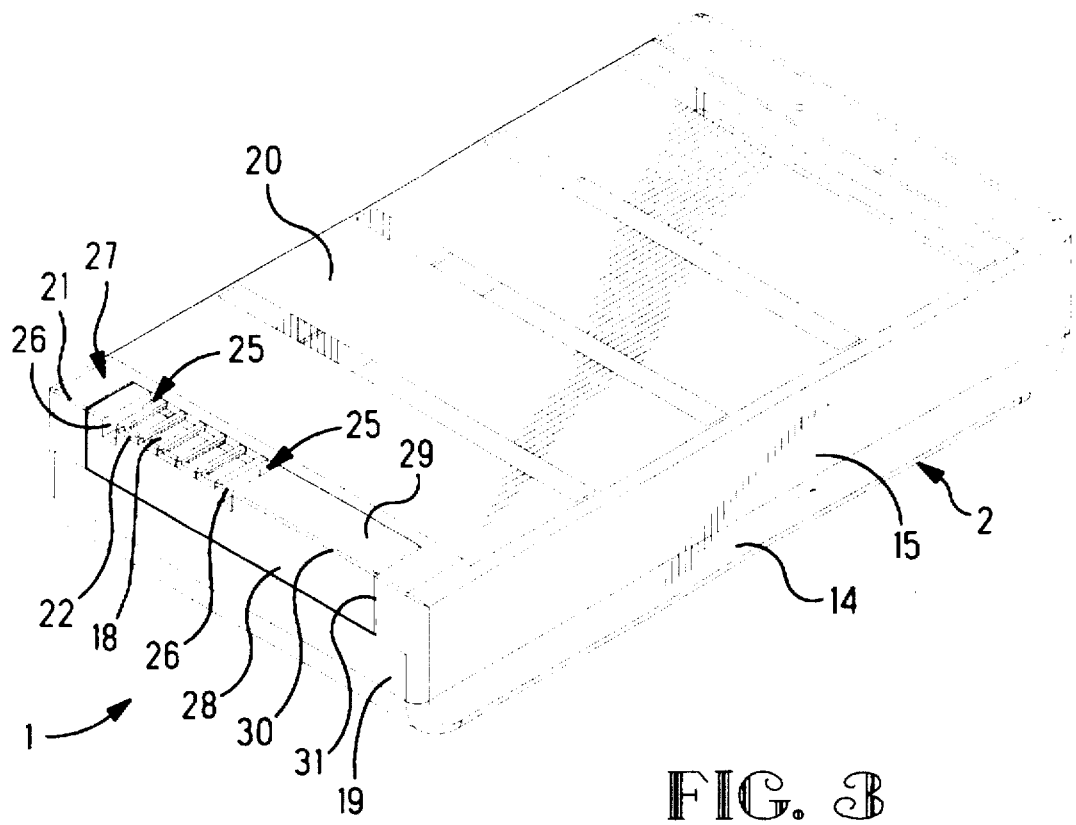
FIG. 3 is an isometric view of the structure shown in FIG. 1, inverted.
Figure 4:
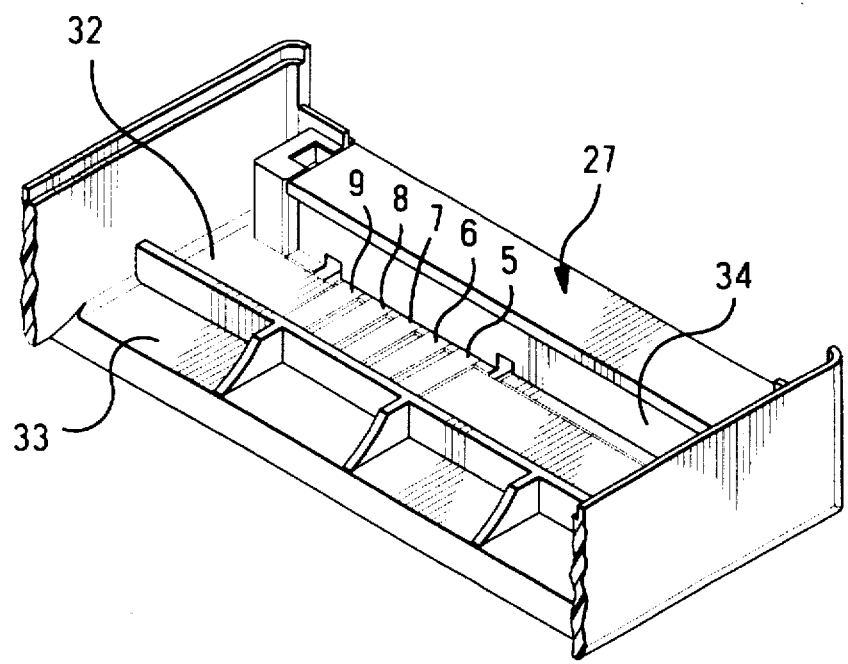
FIG. 4 is an isometric part-selection view of the inside of the end portion of the package base of FIG. 2 showing the connector mounted therein.

With reference to FIGS. 1-3, an electrical connector (1) for a battery (2) comprises, an insulating package (3) containing multiple cells of the battery (2), the cells being disclosed in U.S. Pat. No. 5,470,255 the disclosure of which is hereby incorporated by referaence. A row of battery terminals (5, 6, 7, 8, 9) is mounted on an insulating header (14), FIGS. 2 and 7-9. The terminals are connected to battery cells within the package (3) as described in the aforementioned patent applications.

With reference to FIGS. 1-4, the package (3) is of two piece construction, having a base (15) and a cover (16) fabricated by molding a suitable plastic material. The base (15) and the cover (16) are fused or adhesively secured together or adhesively joined together. The battery terminals (5, 6, 7, 8) are fabricated from metal strip. Each of the terminals (5, 6, 7, 8, 9) extend from inside the package (3) through the base (15), and toward an exterior of the package (3).

With reference to FIG. 3, an accessible portion (18) of each of the battery terminals (5, 6, 7, 8, 9) extends toward an end (19) of the package (3) and is oriented to face toward a bottom side (20) of the package (3). Each accessible portion (18) is accessible through the side (20) of the package (3). The end (19) and the side (20) of the package (3) intersect along the base (15) at an intersection (21). At the intersection (21) of the end (19) and the side (20), the end (19) and the side (20) of the package (3) are recessed for access to the accessible portions (18) of the battery terminals (5, 6, 7, 8, 9). More specifically, a series of recesses (22) are in the intersection (21) between ribs (23) (FIG. 9) separating the accessible portions from one another. The accessible portions (18) of the battery terminals (5, 6, 7, 8, 9) are within respective recesses (22) and are recessed from the exterior surface of the package (3) Accordingly, the end (19) and the side (20) of the package protect the battery terminals (5, 6, 7, 8, 9) from being touched accidentally, while the battery (2) is being carried about.

The end (19) and the side (20) of the package (3) are adapted to matingly engage another, mating electrical connector as disclosed in U.S. patent application Ser. No. 08/035,817, filed Mar. 23, 1993. A recessed coupling (25) is divided into two portions at opposite ends of the row of battery terminals (5, 6, 7, 8, 9). The two portions of the coupling (25) are inside respective recesses (26) in the end (19) and in the side (20) of the package (3). Recesses (26) are of selected widths and are spaced apart a known distance, to distinguish the package (3) from another, incompatible package (3) having a different spacing or sizes for the recesses (26). The recesses (22) and the ribs (23) and the barrier receiving recesses (26) are offset to one side of a central axis of the connector (1) and of the battery (2) that is fabricated with the connector (1). Such a feature provides a keying combination that will resist a connection of the battery terminals (5), (6), (7) and (8) with terminals of another mating electrical connector having an incompatible keying combination. Each of the terminals (5, 6, 7, 8, 9) is stamped and formed from a thin metal blank. Barbs (24) extend in a plane of thickness of the terminals (5, 6, 7, 8, 9) and from opposite lateral sides. When the elongated terminals (5, 6, 7, 8, 9) and (8) are assembled along respective recesses (22), the barbs (24) engage in lateral sides of the recesses (22) to retain the terminals in place.

Figure 5:
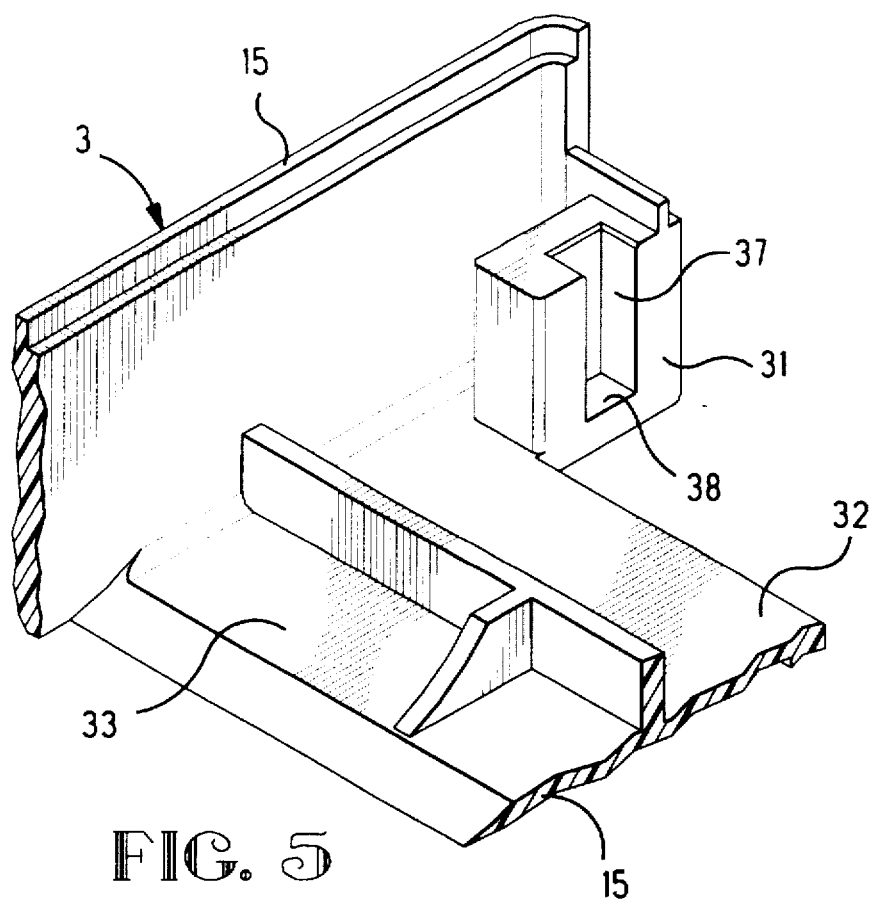
FIG. 5 is an enlarged part-section isometric view of one side of the base end of FIG. 4 with the connector removed.
Figure 6:
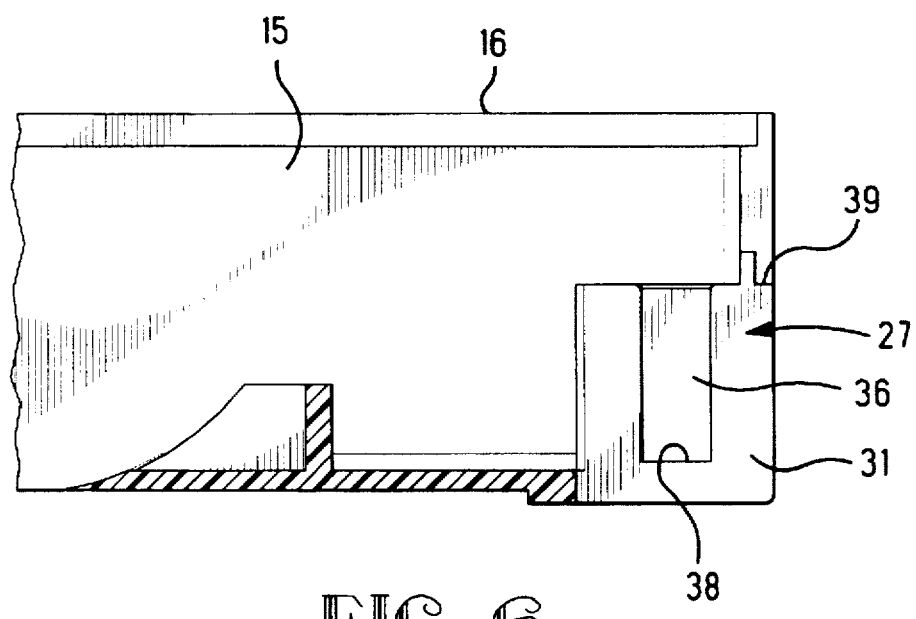
FIG. 6 is an elevation view of the package base of FIG. 5 partially in section.

The terminals are mounted in an insulating header (27) fabricated of molded plastics material. The header (27) is fabricated with the ribs (23), the recesses (22) and the barrier receiving recesses (26). An exterior of the header (27) is fabricated with an exterior end (28) and an exterior side (29) meeting at an intersection (30). The header (27) is mounted within an opening (31), FIGS. 1–3, in the package. The exterior end (28) comprises a portion of the exterior end of the package. The exterior side (29) comprises a part of the exterior side (20) of the package. The intersection (30) comprises a portion of the intersection (21) of the package. The terminals (5, 6, 7, 8, 9), and, more particularly, the battery connecting portions of the terminals extend within a terminal receiving cavity (32) in the package (3) adjacent to the opening (31). The terminal receiving cavity (32) is adjacent to battery cell receiving portion (33) within the package (3). The battery receiving portion (33) is adapted to receive multiple battery cells, not shown. The battery connecting portions of the terminals (5, 6, 7, 8, 9) and are bendable within the terminal receiving cavity (32) enabling manipulation of the terminals during the process of connection with the battery cells within the portion (33) of the package (3). Advantageously, the cavity (32) separates the terminals (5, 6, 7, 8, 9) from the battery cells to provide a space within which the terminals (5, 6, 7, 8, 9) and (8) can be manipulated. The header (27) and package (3) are constructed for being interlocked. In particular, the header (27), as shown in FIGS. 7–9, is provided at each of opposite ends (35) with a projecting tongue (36) that fits within respective elongated grooves (37), FIG. 5, within the package opening (31). The terminals (5, 6, 7, 8, 9) project outwardly from an interior end (34) of the header (27). The interior end (34) faces toward the terminal receiving cavity (32). The header (27) becomes seated in the part of the package (3) comprising the base (15) when, as shown on FIG. 6, the ribs (36) engage against a closed end (38) of the respective grooves (37). The header (27) is assembled slidably by engagement of the tongues (36) sliding within respective grooves (37). The grooves (37) provide sliding guides with stops in the sliding guides being provided by the closed ends (38) of the grooves (37). The cover (16) of the package (3) has a projecting lip (39), FIG. 2. The lip overlaps and engages the header (27) within the opening (31), FIG. 6. Accordingly the lip (39) on the part of the package comprising the cover (16) is assembled on the first part of the package comprising the base (15), and engages the header (27) and resists movement of the header (27).

An advantage of the invention resides in a battery constructed with a package having a pre-assembled header and battery terminals, with the battery terminals extending into the package for manipulation during connection with battery cells within the package.

Another advantage of the invention resides in a battery package which has rear-extending battery terminals for connection with battery cells within the package, and battery connecting portions of the terminals contained within a terminal receiving cavity of the package.

Other embodiments and modifications of the invention are intended to be covered by the spirit and scope of the appended claims.

I claim:

1. An electrical connector to removably connect a battery to electronic equipment to provide electrical energy thereto, comprising:

an insulating package and a header assembly adapted to be assembled to the package;

the header assembly having an insulating header and conductive battery terminals on the header, portions of the terminals being exposed within respective recesses in at least one of an exterior side and an exterior end of the header for connecting with the electronic equipment, battery connecting portions on the terminals to connect with battery cells, barrier receiving recesses beside the terminals, the barrier receiving recesses being in the exterior side of the header and extending to communicate with the exterior end of the header at an intersection thereof with the exterior side; and the insulating package having a header-receiving opening at an intersection of an exterior end and an exterior side thereof, and interlocking with the header upon placement of the header assembly into the header-receiving recess such that the battery connecting portions of the terminals extend within a terminal receiving cavity of the package that is adjacent to a battery cell receiving portion of the package for connection to the battery cells upon complete assembly of the connector, the battery connecting portions of the terminals being bendable within the terminal receiving cavity during package assembly, and the battery connecting portions of the terminals being adapted for connection to battery cells in the battery receiving portion of the package, and the exterior end of the header completing the exterior end of the package, the exterior side of the header completing the exterior side of the package, and the exposed portions of the terminals being recessed along recesses in the exterior side of the package upon assembly of the header to the package for connection with the electronic equipment.

2. An electrical connector as recited in claim 1 wherein, the header is seated in a first part of the package, and a second part of the package engages the header and resists movement of the header.

3. An electrical connector as recited in claim 1 wherein, the header is assembled slidably onto a first part of the package, and a second part of the package is assembled onto the first part, the second part of the package engages the header and resists movement of the header.

4. An electrical connector as recited in claim 1 wherein, sliding guides in the first part of the header, stops in the sliding guides, the header being slidable along the sliding guides until the header is in registration with the stops, and a second part of the package is assembled on the first part of the header, and the second part of the package engages the header and resists movement of the header.

5. An electrical connector to removably connect a battery to electronic equipment to provide electrical energy thereto, comprising:

an insulating package and a header assembly adapted to be assembled to the package;

the header assembly having an insulating header and conductive battery terminals on the header, battery connecting portions on the terminals to connect with battery cells, upon assembly of the header to the package an exterior end of the header comprising a portion of and completing an exterior end of the package, and an exterior side of the header comprising a portion of and completing an exterior side of the package, and all outwardly exposed portions of the terminals being recessed along respective recesses in the exterior side of the package, and battery connecting portions of the terminals extending into a terminal receiving cavity of the package for connection to battery cells within the package.

6. An electrical connector as recited in claim 5 wherein, the battery connecting portions of the terminals extend within the terminal receiving cavity of the package that is adjacent to a battery cell receiving portion of the package.

7. An electrical connector to removably connect a battery to electronic equipment to provide electrical energy thereto, the connector comprising:

conductive battery terminals, an insulating package containing the terminals, battery connecting portions on the terminals to connect with battery cells within the package, an initially separate insulating header on which the terminals are mounted, and upon assembly to the package the header having an exterior side comprising part of an exterior side of the package, and the header having an exterior end comprising part of an exterior end of the package, exposed portions of the terminals being recessed into the exterior side of the header, and barrier receiving recesses in the exterior side of the header to receive mating barriers of another mating electrical connector, the barrier receiving recesses communicating with the exterior end of the header.

8. An electrical connector as recited in claim 7 wherein, the terminals are coplanar, and ends of the terminals remain within the recesses in the exterior side of the header.

9. An electrical connector as recited in claim 7 wherein, the terminals project into a terminal receiving cavity in the package, the terminal receiving cavity being adjacent to a battery cell receiving portion of the package.

* * * * *